United States Patent [19]

Mahler

[11] 4,233,631
[45] Nov. 11, 1980

[54] TELEVISION SYSTEM FOR DISPLAYING AND RECORDING PATHS OF MOTION

[75] Inventor: Henry W. Mahler, Newtown, Conn.

[73] Assignee: CBS Inc., New York, N.Y.

[21] Appl. No.: 948,362

[22] Filed: Oct. 4, 1978

[51] Int. Cl.³ ............................................. H04N 5/22
[52] U.S. Cl. .................................... 358/182; 358/22; 358/183
[58] Field of Search .................. 358/22, 105, 93, 182, 358/185, 183, 23, 24; 340/706, 725, 729; 273/DIG. 28

[56] References Cited

U.S. PATENT DOCUMENTS

| 3,673,324 | 6/1972 | Ito et al. | 358/182 X |
| 3,851,096 | 11/1974 | Collins et al. | 358/105 |
| 3,970,774 | 7/1976 | Bazin et al. | 358/182 X |
| 4,005,261 | 1/1977 | Sato et al. | 358/93 X |
| 4,025,718 | 5/1977 | Paretti | 358/105 X |
| 4,168,510 | 9/1979 | Kaiser | 358/105 X |

FOREIGN PATENT DOCUMENTS 1286806  8/1972  United Kingdom .................... 358/182

OTHER PUBLICATIONS

SMPTE Journal: Oct. 78, vol. 87, No. 10, pp. 673-676-A Recent Innovation in Digital Special Effects.

Primary Examiner—Raymond F. Cardillo, Jr.
Assistant Examiner—Aristotelis M. Psitos
Attorney, Agent, or Firm—Spencer E. Olson

[57] ABSTRACT

In television apparatus for producing signals for displaying simultaneously a succession of time-separated images of an object moving in an otherwise static scene, control is provided for causing a limited number of decaying stroboscopic images of successive positions of a moving object to appear behind the image representing the latest position of the moving object.

8 Claims, 4 Drawing Figures

TELEVISION SYSTEM FOR DISPLAYING AND RECORDING PATHS OF MOTION

BACKGROUND OF THE INVENTION

This invention relates to television apparatus, and more particularly, to a system for providing a television display which portrays the path of motion of a moving object in an otherwise static scene wherein a limited number of decaying images appear behind the latest image of the moving object.

Commonly assigned patent applications Ser. Nos. 864,405 filed Dec. 27, 1977 now U.S. Pat. No. 4,179,704, and 944,236 filed Sept. 20, 1978, both entitled "Television System for Displaying and Recording Paths of Motion", describe systems for providing a television display which portrays the motion of an object in a scene during a selectable time interval such that, in addition to its present position being shown, a plurality of earlier positions commencing with the start of the time interval, are also depicted. This effect is achieved by storing a reference field of video representing the scene at the start of the desired action, comparing picture elements of subsequently arriving video with those of the reference field, tagging and storing those picture elements measurably different from corresponding picture elements in the reference field, and displaying the real time video with the substitution of those tagged and stored picture elements which comprise the successive images of the moving object. While similar results are theoretically possible if subsequently arriving television frames are compared with a stored reference frame, because one cannot effectively display a frozen frame of video, where image motion is involved, without causing inter-field flutter, the data preferably is stored in a one field format, and as this data is recirculated, this single field is interlaced with itself. Thus, the term "field" uniformly used in the present description and claims is intended to also encompass "frame", unless obviously inapplicable or unless specific exception is made. The system provides television special effects with most of the benefits of stroboscopic photography, and additionally provides functions previously unavailable in film or television. These results are obtained without special lighting setups or black backgrounds, as are required for stroboscopic photography, and are available both live and in replay during the normal course of coverage of sporting or other events.

Although the systems described in the copending applications provide display of successive positions of a moving object moving over a selectable time period in an otherwise static scene, in situations where it is desired to display a multiplicity of sometimes overlapping paths of motion of an object, for example, repeated flights of a tennis ball back and forth across the net, the separated images of the ball in the earlier occurring trajectories would tend to obscure the images recorded in later flights, resulting in a confusing overlap of image positions which would give little useful or aesthetic information on any given trajectory, including the latest. When watching a televised tennis match, particularly in situations where there is a sustained volley, the viewer will have little interest in already completed volleys and is really interested only in the trajectory of the ball back and forth across the net in the latest one or two volleys, with major interest in the most recent trajectory. Thus, a system for displaying multiple, possibly crisscrossing, paths of motion of a moving object desirably should delete or "erase" from the display those images of the moving object representative of an earlier trajectory of the moving object so as to display only spaced apart images of more recent successive positions of the moving object. A particularly desirable display is one in which the image representing the current or present position of the object has a predetermined brightness behind which appear a limited number of spaced apart images of continuously and progressively decaying intensity.

SUMMARY OF THE INVENTION

The primary object of the present invention is to improve the viewability of a television display of the kind described above, particularly in situations in which multiple successive paths of motion of the object whose motion is to be portrayed tend to crisscross each other, or in which the viewer would be interested in only a limited number of images preceding the current image of a moving object.

Briefly, this object is achieved by a system similar to those described in the aforementioned copending applications in that it includes a reference field store for storing video representing a scene at the start of an action cycle, a comparator for comparing picture elements of selected subsequently arriving television fields with corresponding picture elements of the stored reference field, and means for tagging and storing those picture elements of the selected subsequently arriving fields shown by the comparison to be measurably different from corresponding picture elements in the reference field. However, whereas the action cycle of the previous systems is terminated by the operator, at which time there is provided a video signal for display representing the substantially static scene with the substitution therein of those picture elements stored during the selected time period, in the present system the action is live and continuous, with a preselected amplitude proportion of the tagged picture elements mixed with a complementary amplitude proportion of the real time video, thereby to cause the tagged picture elements to decay in amplitude at a selectable rate. The system operates in a recursive mode thereby to cause earlier images of the moving object each to decay by a predetermined amount with each sampled mix of a subsequently arriving field and the stored field, and causing earlier images to decay into the background of the scene.

BRIEF DESCRIPTION OF THE DRAWINGS

Other objects, features and advantages of the invention will become apparent, and its construction and operation better understood, from the following detailed description, taken in conjunction with the accompanying drawings, in which.

DETAILED DESCRIPTION OF THE PREFERRED EMBODIMENT

Figure 1:
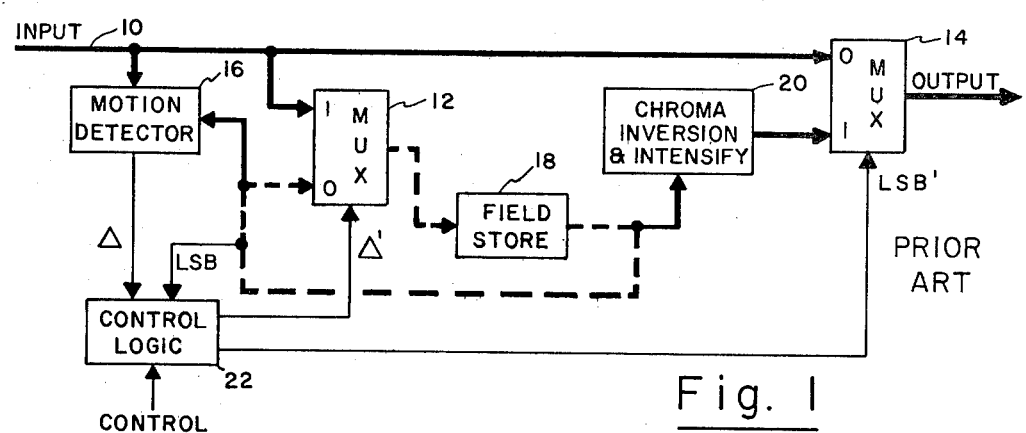
FIG. 1 is a functional block diagram of the system described in aforementioned U.S. Pat. No. 4,179,704.

The following detailed description is of the best presently contemplated mode of carrying out the invention. This description is not to be taken in a limiting sense, but is made merely for purposes of illustrating the general principles of the invention since the scope of the invention is best defined by the appended claims.

As background for an understanding of the present invention, the motion display system described in the aforementioned U.S. Pat. No. 4,179,704 will be briefly described with reference to the functional block diagram of FIG. 1. Assuming implementation in the digital domain for use with NTSC color television, an encoded video input signal on input line 10 is applied to the "1" input terminal of a first multiplexer 12, to the "0" input terminal of a second multiplexer 14, and to one input terminal of a motion detector 16. At the start of an "action interval" initiated by the operator, the first field of video is coupled via multiplexer 12 to a digital field store 18 having the capability of storing one pulse code modulated video field. This initial reference field is stored leaving all LSBs=0, the least significant bit being used as a control bit for purposes to be described below. The output of field store 18 is applied to a chroma inversion and intensification circuit 20, which may include a comb filter chrominance inverter of known construction synchronized to the input chrominance reference, for ensuring the proper phase relationship between the color subcarrier of the output of field store 18 and the input chrominance reference. The output of field store 18 is also connected to the "0" input of multiplexer 12 and to a second input of motion detector 16. The dashed data line from the output of multiplexer 12 through field store 18 and back to the "0" input of multiplexer 12 represents a circulating loop for the reference field stored in field store 18. The least significant bit of the words stored in field store 18 is used as a control bit which is applied to a first input of a control logic 22, which, in response to the control bit and an appropriate signal from motion detector 16, generates a logic signal LSB' for controlling multiplexer 14. The input to control logic 22 marked "CONTROL" is an enabling logic level for the control of both multiplexers, when other conditions are satisfied, for establishing sampling rates, keying, etc.

A selectable number of fields following storage of the reference field, as determined by the "CONTROL" to control logic 22, the input digital video on line 10 is compared in motion detector 16 to that stored in field store 18. The motion detector subtracts the picture elements stored in field store 18 from corresponding elements of the input video, and the absolute value of the difference is compared with a preset number to produce a control signal Δ which is fed to control logic 22 to produce a logic signal output, Δ', for controlling multiplexer 12. When the difference exceeds the preset threshold level, motion is assumed to have occurred and the associated input video picture element is stored in field store 18 by the control action of Δ' providing LSB=0. This process is continued at the selected field sampling rate until the operator terminates the cycle. For convenience in logic and control, the least significant bit of each video picture element substituted in field store 18 as a result of motion is made a logic "1"; this provides the added function that a video motion element which has been stored with LSB=1 will not thereafter be changed even if motion is detected. The latter is necessary so that the reappearance of the static background after the passage of the moving object will not delete the true stored object position.

While the "action cycle" is underway, input video is coupled to the output via multiplexer 14, which is controlled by LSB' which, as has been noted, is a logic signal generated by control logic 22 from the least significant bit out of field store 18. When that bit is logic "1", the output video is derived from field store 18 rather than from the input video. Thus, the output signal available is the live video with the earlier images of any moving objects added. When the cycle is terminated by the operator, the last field of video is combined with the stored images in field store 18 and retained as a frozen composite frame in field store 18, and is available as an "instant replay" freeze frame with the action which has occurred during the cycle shown stroboscopically.

The field store 18 preferably contains data in a one field format only. While recirculating data, this single field is interlaced with itself to eliminate inter-field flutter, a problem encountered with still-frame reproduction of scenes containing rapid motion. To preserve the chrominance phase continuity for successive frames, an alternating chroma inverter 20 is employed in the feed to multiplexer 14. In the described system, precedence is given to earlier positions of the moving object when overlap of successive images occurs. However, precedence can be given to the most recent motion so that, during image overlap conditions, the more recent information is retained and the earlier overlap information is replaced, by modifying the system of FIG. 1 in accordance with the teachings of aforementioned co-pending application Ser. No. 944,236, the disclosure of which is hereby incorporated herein by reference.

In both implementations, the key element to the system is the differentiation between the static elements of the scene and those which have been subject to motion, making it possible to identify and selectively modify the stroboscopic images. Thus, the stroboscopic tracks of moving objects can, at the choice of the operator, be contrast enhanced or caused to blink at a selectable rate, as more fully described in commonly assigned co-pending application Ser. No. 869,567 filed Jan. 16, 1978, now U.S. Pat. No. 4,168,510. The present invention expands upon the above-mentioned control features to cause a limited number of decaying images of a moving object to appear in the display behind the latest image of the object.

The present invention, which is equally useful in either of the two implementations of the motion display systems alluded to above, will now be described by way of illustrative example as embodied in the implementation of FIG. 1, reference being had to the functional block diagram of FIG. 2 in which elements corresponding to those found in FIG. 1 are identified by the same reference numerals. It will be noted that the system of FIG. 2 differs from that of FIG. 1 in the addition of a mixer 24 having two inputs, one of which is connected to the output of field store 18 and the other of which is connected to input line 10 for receiving the encoded input video signal. The output of mixer 24 is applied to the "0" input of multiplexer 12. Thus, mixer 24 is, in effect, inserted in the recirculating loop which includes multiplexer 12 and field store 18. As in the system of FIG. 1, the input video is applied to the "1" input of multiplexer 12. The function of mixer 24 is to produce a signal consisting of a mix of a predetermined proportion of the amplitude of those picture elements substituted in field store 18 that have been subject to motion with a complementary proportion of the amplitude of the real time video during each update of the information contained in field store 18. For example, the parameters of the mixer 24 may be chosen so as to mix one-fourth of the amplitude of the input video signal with three-fourths of the amplitude of the stored picture elements which have been subject to motion, thereby to cause the amplitude of the motion elements to decay at a rate determined by the rate of comparison of subsequently arriving fields with the reference field ("update rate") and the percentage of mix. This action provides a continuous "decay" or "fade-out" of the images representing earlier positions of the object in motion, with their eventual disappearance from the scene. Thus, a ball bounced repeatedly back and forth in an otherwise substantially static scene will generate a decaying trailing image of previous positions of the ball.

Figure 3:
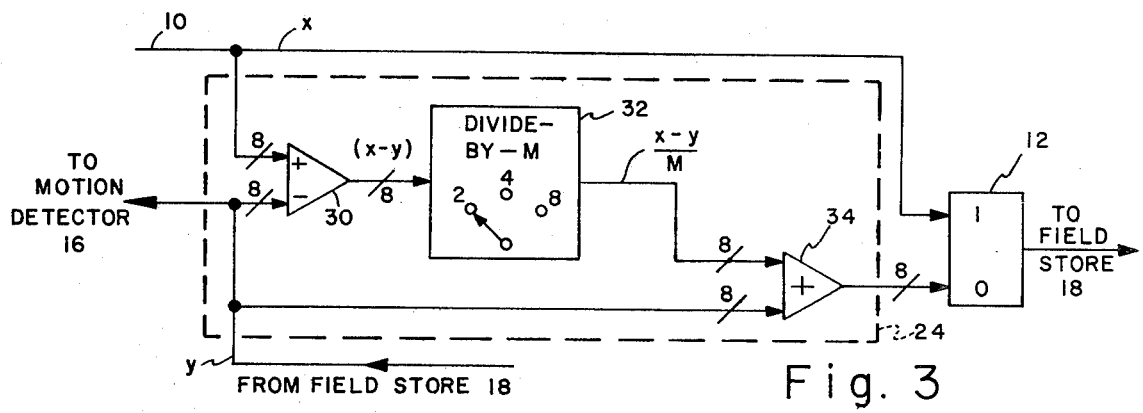
FIG. 3 is a functional block diagram of a circuit for performing the mixing function in the system of FIG. 2.
Figure 4:
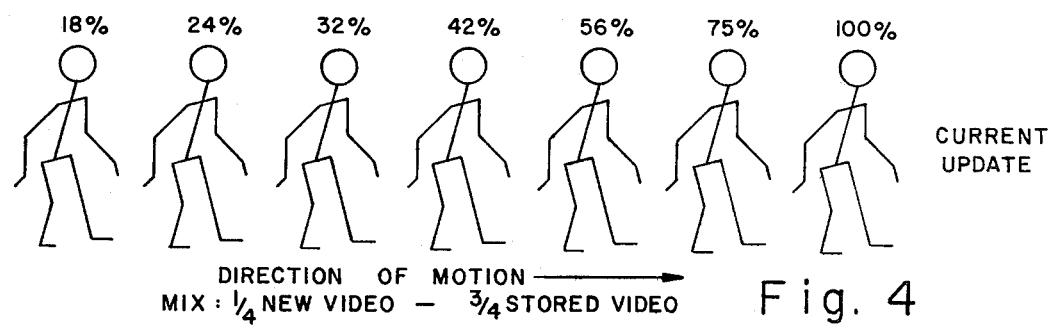
FIG. 4 is a diagram illustrating the effect on the display of the operation of the system of FIG. 2.

The effect achieved by the invention is graphically illustrated in FIG. 4, wherein the object in motion is a man walking from left to right and, as in the just described example, the arriving video and the video stored in the recirculating loop are mixed in the amplitude proportions one-fourth and three-fourths, respectively. In this example, then, at the latest position of the figure the stored picture elements added to field store 18 as a result of motion to that position are at full or 100% amplitude as indicated above the image in the far right position. The stored picture elements representing the next previous position are at 75% of their initial amplitude, and the stored picture elements representative of the image of the second previous position is 56% of the current update amplitude, and so on, until at the position six updates earlier than the current update, the amplitude of the stored motion elements is 18% of the current update amplitude. It is to be noted that in each case the amplitude of the picture elements resulting from motion is three-fourths of what it is for the next latest position; continuing the process it will be seen that the amplitude of the motion elements representing the image twelve updates earlier than the current update will have an amplitude of about 3% that of the current update amplitude. Thus, there is a continuous decay or fade-out of the images representing earlier positions of the moving object, and they eventually disappear from the display. It will now be appreciated that if a smaller percentage of the amplitude of the stored video, say 50%, is mixed with 50% amplitude new video, the decay process would be accelerated; in this case, the amplitude of the stored motion element information representing the moving object image five updates previous to the current update would have only 3% of the current update amplitude. Thus, it is seen that stored picture elements resulting from motion will decay in amplitude toward the live video amplitude at a rate determined by the percentage of mix of stored and live video and the update rate of the system. As has been noted earlier, the "CONTROL" for control logic 22 includes control of the update rate, and as will be seen from the description of FIG. 3 to follow, provision is made for preselecting, from several values, the percentage mix of new and stored video. Thus, it is possible to adjust the decay rate so as to be appropriate for the display of a variety of different moving objects and motion rates. For example, a different decay rate may be required to enhance the stroboscopic display of a ballet dancer than would be used in displaying the trajectory of a tennis ball.

Having described the function of the mixer 24 in FIG. 2, a circuit for performing this function, illustrated in the functional block diagram of FIG. 3, will now be described. Again assuming digital implementation and 8-bit PCM-encoded input video signals, and designating the input video signal on line 10 as x and the recirculating video at the output of field store 18 as y, the total past value of the stored video is compared element-by-element with the incoming or live video signal. That is, the 8-bit word representing the amplitude of the total past signal in field store 18 is compared bit-by-bit with the 8-bit word representing the amplitude of the arriving video signal. To this end, the 8-bit words representing the stored signal y and the arriving video signal x are applied to the minus and plus input terminals, respectively, of a difference amplifier 30 which is operative to subtract the y signal from the x signal. The measured difference, if any, an 8-bit word designated (x−y), is applied to a digital divider 32 which is operative to divide the different signal by the factor "M", the value of which may be selected by the operator from among several values, say, 2, 4 and 8, by actuation of a control knob on the front panel of the equipment, diagrammatically shown in block 32. If M=2, the least significant bit of the 8-bit word representing the amplitude of (x−y) is dropped; if M=4, the two least significant bits are dropped; and, if M=8, the three least significant bits are dropped. The output signal from the divider 32, designated x−y/M, is added in a summer circuit 34 to the y signal from field store 18 to produce at the output of the summer an 8-bit word having a value of y+(x−y/M). This signal is applied to the "0" input of multiplexer 12 and is returned to the field store 18 to become the latest recirculating data.

How mixer 24 functions to achieve the desired effect will be clear from an illustrative numerical example, in which "M" is assumed to have a value of four so as to correspond with the earlier example depicted in FIG. 4. The amplitude of a current update signal, x, which is coupled to field store 18 via the "1" input of multiplexer 12, is assumed to have an initial value of unity or 100%. A current update signal x becomes y after the delay determined by field store 18 and the selected update rate. At that later time, x will have vanished because of continuing motion of the object. Therefore, initially x=1 and y=0; the selected time later, x=0 and y=1. After one update passage of that signal y through the recirculating loop and operation of the mixer thereon according to the equation (x−y)/M+y, the amplitude will be (0−1)/4+1=¾, or 75% of the initial amplitude. After the next update passage, the amplitude decays to (0−¾)/4+¾=9/16, or 56.25% of the initial value; after the third passage, the amplitude decays to about 42% of the initial value, and so on, until y ultimately equals x, the level of the background, whereupon the image disappears into the background and is no longer displayed.

Figure 2:
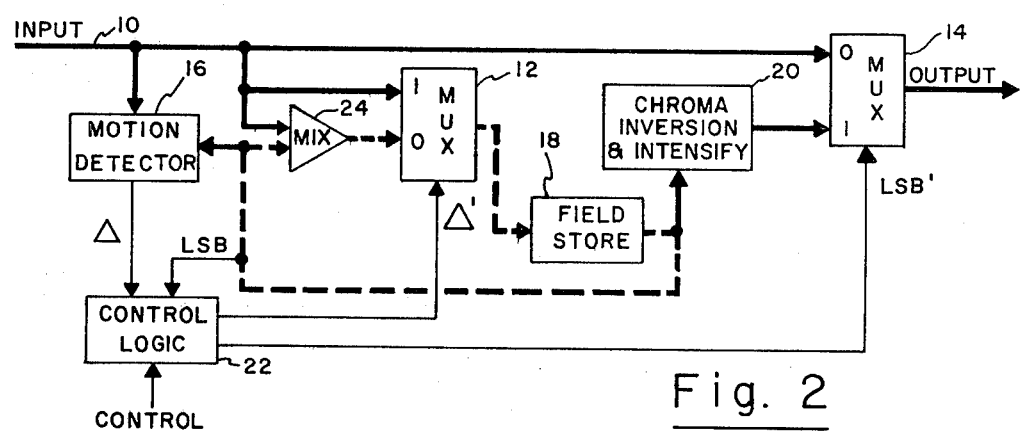
FIG. 2 is a functional block diagram of a motion display system embodying the present invention.

The operation of the system of FIG. 2 is essentially the same as that described above for the FIG. 1 system, with the important difference that once initiated by the operator, the operation is continuous and need not be terminated to achieve the desired display. That is, by virtue of the fact that only a limited number of decaying images appear behind the latest image of the moving object (the number being determined by the update rate and the value of the factor "M"), the system is "self-timing" as to what appears in the ultimate display. More specifically, when the system is in operation, input video is coupled to the output via multiplexer 14, which is controlled by LSB', the logic signal generated by control logic 22 from the least significant bit out of field store 18. When that bit is logic "1", the output video is derived from field store 18 rather than from the input video. Thus, by virtue of the operation of mixer 24, the output signal available is the live video with a selectable number of earlier images of any moving objects added, the intensity of which decay as a function of the time they are displaced from the current or present position of the object. Thus, the system may be allowed to function so long as it is desired to display with this effect an object in motion, it being unnecessary to establish any particular "action cycle". However, if at any time the operator wishes to terminate this type of display, he can do so by actuation of the "STOP" control (included in the CONTROL for control logic 22) which is operative to disable mixer 24 to thereby prevent further decay of the then present images of the moving object, and cause the output signal to represent a display of images of the moving object at their then state of decaying amplitude.

Although all images of earlier positions of the moving object eventually disappear in the background, the information concerning the faded out images is still contained in field store 18 as tagged elements which cannot be changed even if motion at the same position in the scene is subsequently detected by motion detector 16. In order to permit later information regarding movement of an object to occur where previous tagged information elements existed, means may be provided to remove the "tag" from a previously stored motion element when it no longer generates a significant difference signal in mixer 24; that is, once the amplitude of the tagged picture elements drop below the amplitude of the motion threshold, such elements are replaced by background information and the tag removed. Thus, in the previously described example of the mixing ratio of 50% stored video and 50% new, when the moving object has decayed to say 6% of the current update amplitude, the originally tagged picture elements representing that position would be removed from the field store and those elements of the store again made available for capturing later motion and generation of new tags.

It will be recognized from the foregoing description that the origin of the input video signal, provided it has the characteristics of the conventional NTSC color television, does not affect its operation; that is, the incoming video may be derived from a color television camera, from a video tape recorder, from a slow motion reproducer, or from telecine apparatus.

Although the invention has been described as applied to the NTSC system of color television, it is obviously directly applicable to monochrome television, and also, with relatively minor modification in the circuitry for handling the color component, to other known color television systems, such as PAL and SECAM. Thus, while the invention has been described with reference to a specific preferred embodiment, along with suggested modifications to adapt it to other applications, it is intended that such modifications, and others that will now be apparent to ones skilled in the art, be encompassed by the following claims.

I claim:

1. Apparatus for generating from arriving television signals, video signals for displaying simultaneously a succession of images of an object moving in an otherwise substantially static scene, said apparatus comprising:

storage means for storing a reference field of video representing said scene at an operator controllable start time;

means for comparing picture elements of selectable time-separated subsequently arriving television fields with corresponding picture elements of said reference field;

means operative in response to detection of differences between corresponding picture elements of said subsequently arriving fields and said reference field for tagging and storing those picture elements of said subsequently arriving fields that caused the detected difference;

means for successively mixing in synchronism with the arrival of selected subsequently arriving television fields previously tagged and stored picture elements that caused detected differences with corresponding picture elements of each of the said selectable subsequently arriving fields and producing a resultant signal containing a controllable fractional amplitude portion of the previously stored picture elements and a controllable fractional amplitude portion of corresponding picture elements of each of the selectable subsequently arriving fields and storing the resultant signal with said previously tagged and stored picture elements; and means connected to receive said tagged and stored picture elements and said subsequently arriving video fields for continuously providing for display, following the said start time, output video signals representing said scene with the substitution therein of those picture elements representing a controllable number of images of said moving object preceding the current image thereof, and in which said images progressively decrease in intensity in the direction toward the earlier image positions of the moving object.

2. Apparatus according to claim 1, wherein said mixing means includes means for selecting in complementary fashion the fractional amplitude portions of previously tagged and stored picture elements and corresponding picture elements of subsequently arriving fields.

3. Apparatus according to claim 1 or claim 2, wherein said apparatus further comprises:

means for controlling the rate at which subsequently arriving television fields are compared with said reference field for determining the number of images of the moving object preceding the current image thereof to be displayed.

4. Apparatus according to claim 3, wherein said mixing means comprises means for successively subtracting, in synchronism with the arrival of the subsequently arriving video fields, signals representing previously tagged and stored picture elements that caused detected differences from signals representing corresponding picture elements of the said selected subsequently arriving video fields to produce difference signals;

means for dividing each difference signal by a factor having a value selectable from a plurality of different values; and means for adding the divided difference signal to the previously tagged and stored signal for that picture element.

5. Apparatus according to claim 1, wherein said arriving television signals are digitally encoded, and wherein said reference field and said tagged picture elements are stored in a common digital field store.

6. Apparatus according to claim 1,
wherein said arriving television signals are digitally encoded,
wherein said reference field storage means is a first digital field store, and
wherein said tagged picture elements are stored in a second digital field store.

7. Apparatus according to claim 5 or claim 6, wherein said apparatus further comprises means for controlling the rate at which subsequently arriving television fields are compared with said reference field, and wherein said mixing means includes means for selecting in complementary fashion the fractional amplitude portions of previously tagged and stored picture elements and corresponding picture elements of subsequently arriving fields.

8. Apparatus according to claim 1, wherein said apparatus further comprises
operator controllable means for disabling said mixing means at an operator selectable time following said start time for providing for display at said selectable time an output video signal representing said scene with the substitution therein of then present stored picture elements representing decaying images of said moving object.

* * * * *